(12) United States Patent
Ogura et al.

(10) Patent No.: US 9,215,004 B2
(45) Date of Patent: Dec. 15, 2015

(54) STATIONARY PROXIMITY WIRELESS COMMUNICATION APPARATUS, PORTABLE PROXIMITY WIRELESS COMMUNICATION APPARATUS, PROXIMITY WIRELESS COMMUNICATION SYSTEM AND PROXIMITY WIRELESS COMMUNICATION METHOD

(71) Applicant: KABUSHIKI KAISHA TOSHIBA, Minato-Ku, Tokyo (JP)

(72) Inventors: Koji Ogura, Tokyo (JP); Koji Akita, Yokohama (JP); Yukako Tsutsumi, Kawasaki (JP); Takayoshi Ito, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 142 days.

(21) Appl. No.: 14/073,291

(22) Filed: Nov. 6, 2013

(65) Prior Publication Data

US 2014/0170980 A1    Jun. 19, 2014

(30) Foreign Application Priority Data

Dec. 13, 2012   (JP) .................................. 2012-272656

(51) Int. Cl.
*H04B 5/00*      (2006.01)
*H04B 7/26*      (2006.01)
*H04W 4/02*      (2009.01)

(52) U.S. Cl.
CPC .................. *H04B 7/26* (2013.01); *H04W 4/021* (2013.01); *H04W 4/023* (2013.01)

(58) Field of Classification Search
CPC .................... G06K 19/0723; G06K 19/07749; G06K 7/10366; G06K 7/10435; H04W 4/008; H04M 2250/04; H04M 2250/14; H04Q 1/138; H04B 5/0056; H04B 5/0062; H04B 5/00; B65D 2203/10; A22C 17/008; B60R 2325/105
USPC ........... 455/41.1, 41.2, 41.3, 39, 42; 340/505, 340/10.1, 10.3, 12.51, 13.26
See application file for complete search history.

(56) References Cited

U.S. PATENT DOCUMENTS

| | | | | |
|---|---|---|---|---|
| 7,731,086 | B2 * | 6/2010 | Saunders et al. | 235/382 |
| 7,769,345 | B2 * | 8/2010 | Johnson et al. | 455/41.1 |
| 8,625,564 | B2 * | 1/2014 | Kawasaki | 370/339 |
| 2014/0080411 | A1 * | 3/2014 | Konanur et al. | 455/41.1 |

FOREIGN PATENT DOCUMENTS

| | | | |
|---|---|---|---|
| JP | 2002-183773 A | 6/2002 | |
| JP | 2002-352198 A | 12/2002 | |

(Continued)

*Primary Examiner* — Sonny Trinh
(74) *Attorney, Agent, or Firm* — Holtz, Holtz, Goodman & Chick PC

(57) ABSTRACT

A stationary proximity wireless communication apparatus has an electromagnetic-wave transmitting and receiving part comprising a first indicator that indicates a zone to place a portable proximity wireless communication apparatus and an antenna that is installed in the zone to emit electromagnetic waves having directivity in a direction of a recommended optimum position suitable to place the portable proximity wireless communication apparatus in the zone from a position different from the recommended optimum position, and a wireless communication part configured to perform modulation and demodulation processes of electromagnetic waves transmitted and received at the antenna.

20 Claims, 13 Drawing Sheets

(56) References Cited

FOREIGN PATENT DOCUMENTS

| JP | 2004-355580 A | 12/2004 |
| JP | 2005-033629 A | 2/2005 |
| JP | 4272365 B2 | 6/2009 |
| JP | 2010-245776 A | 10/2010 |
| JP | 2011-259336 A | 12/2011 |
| JP | 4883125 B2 | 2/2012 |

* cited by examiner

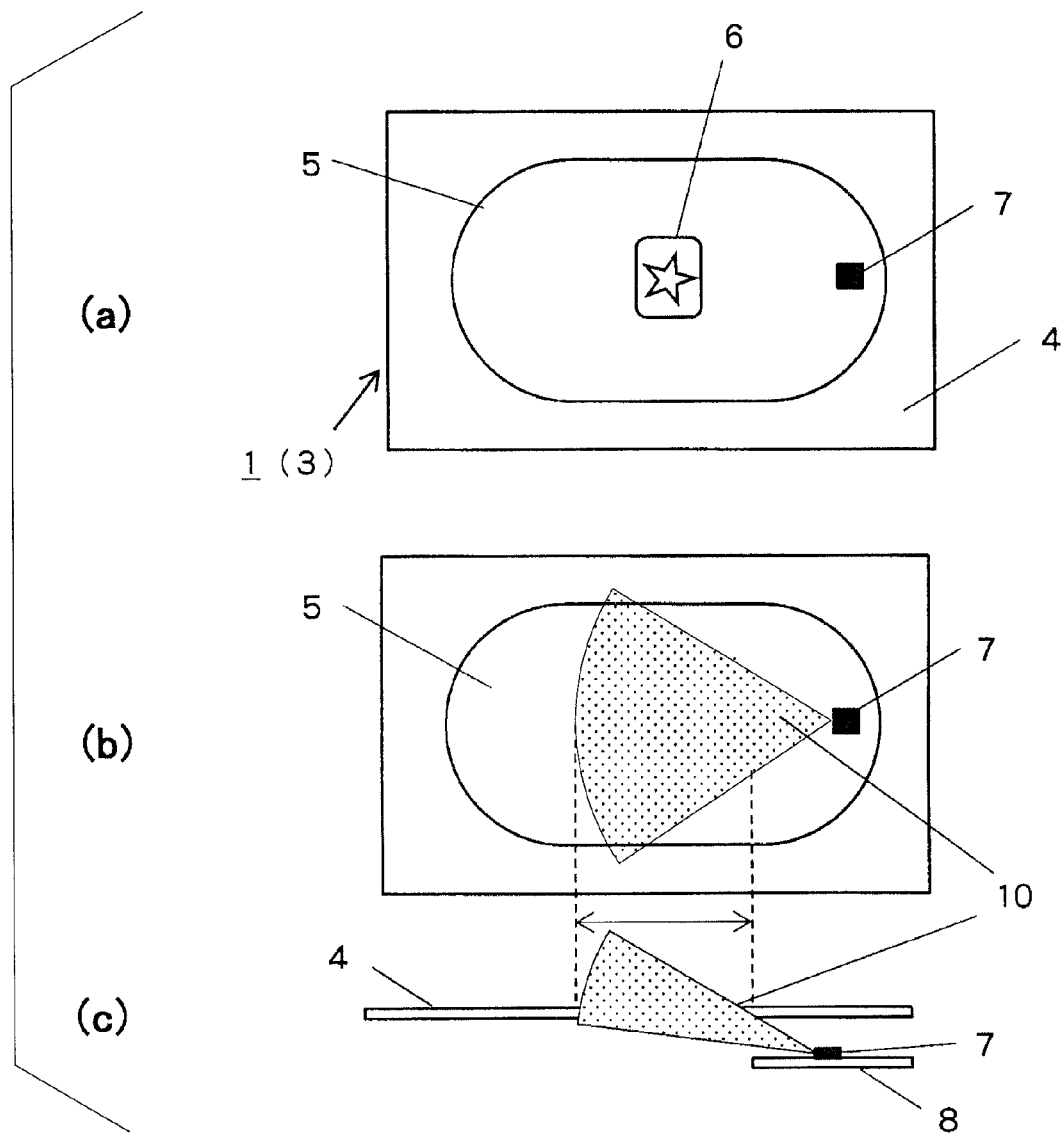
F I G. 6

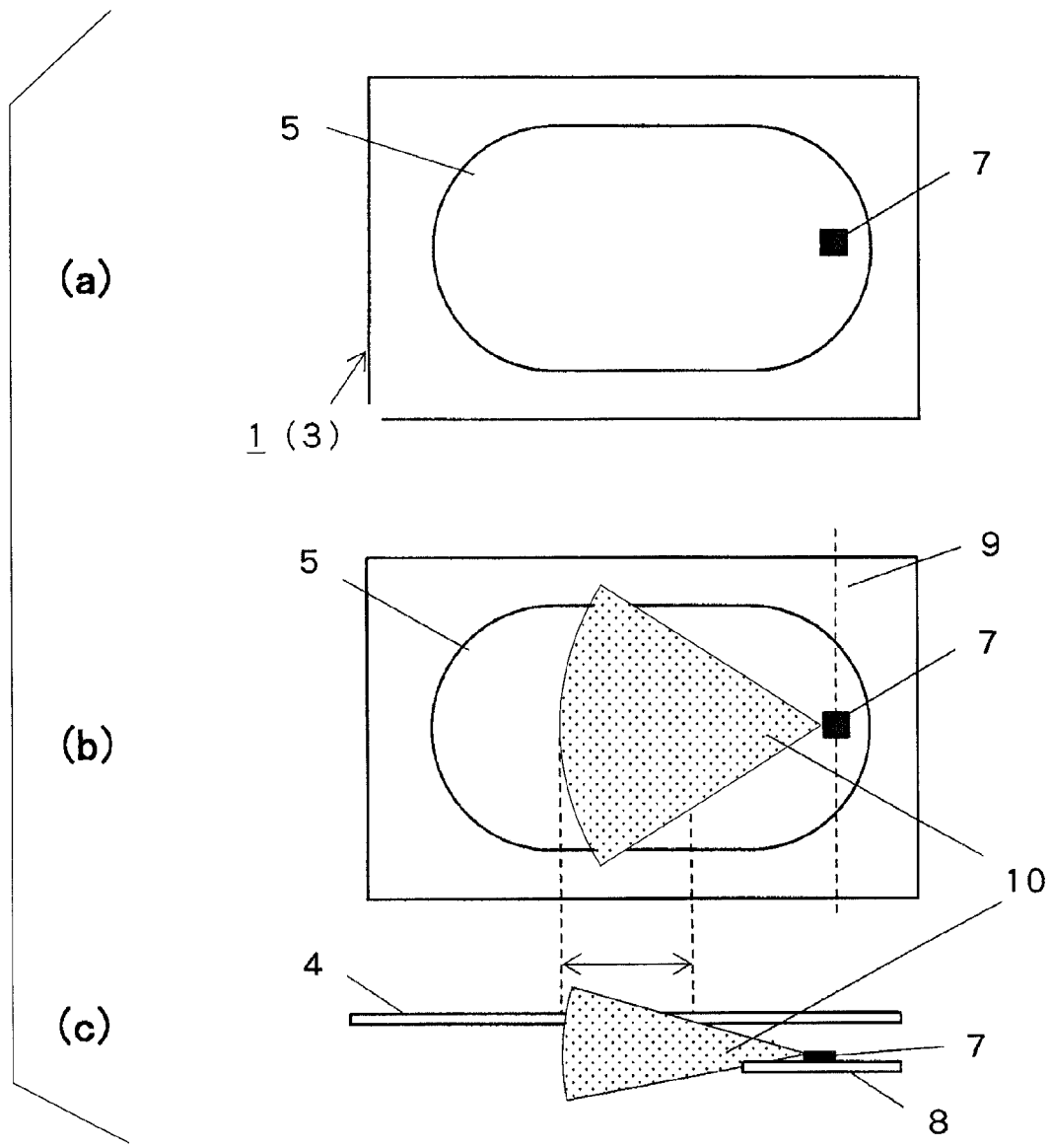
F I G. 7

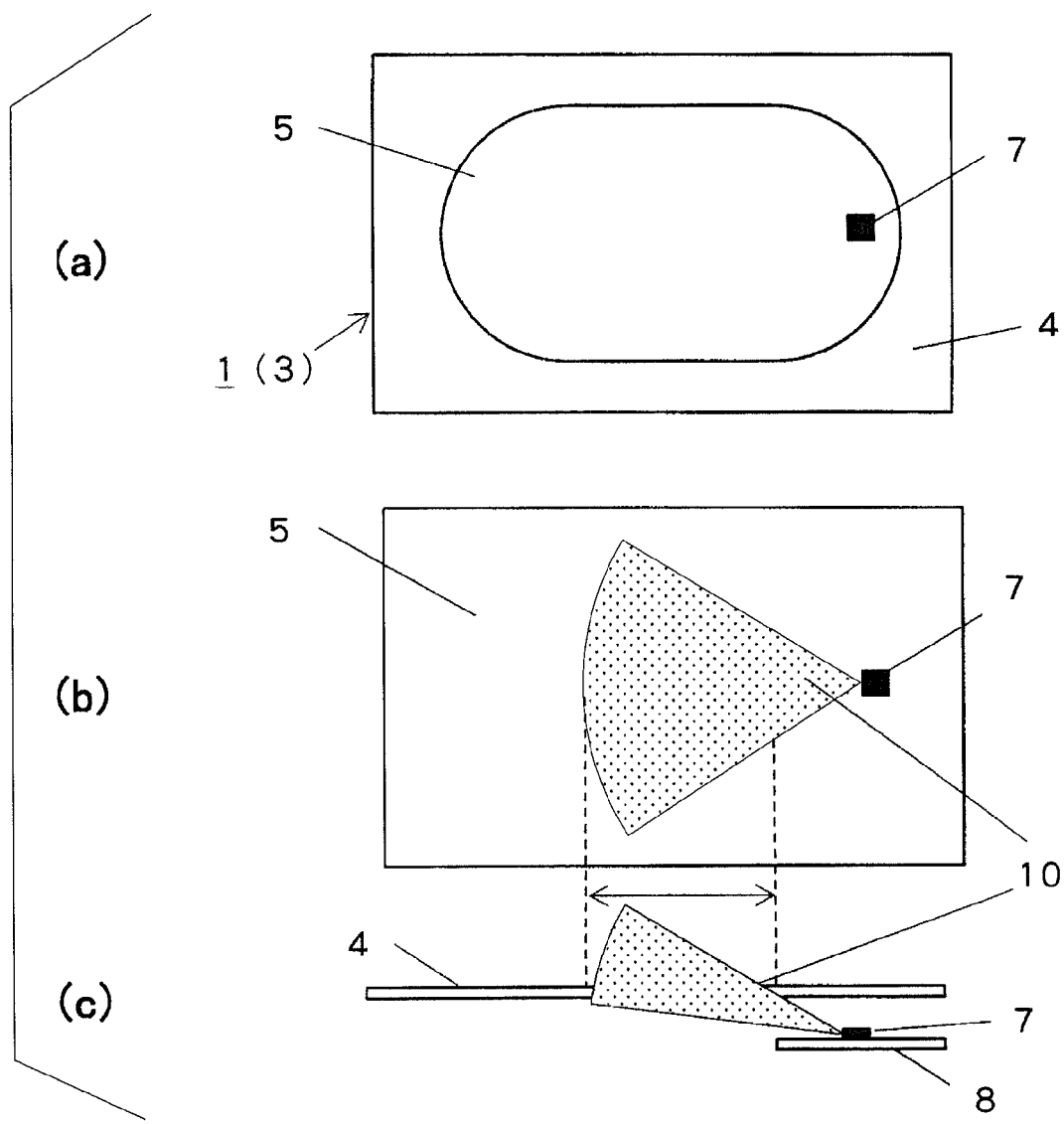
F I G. 8

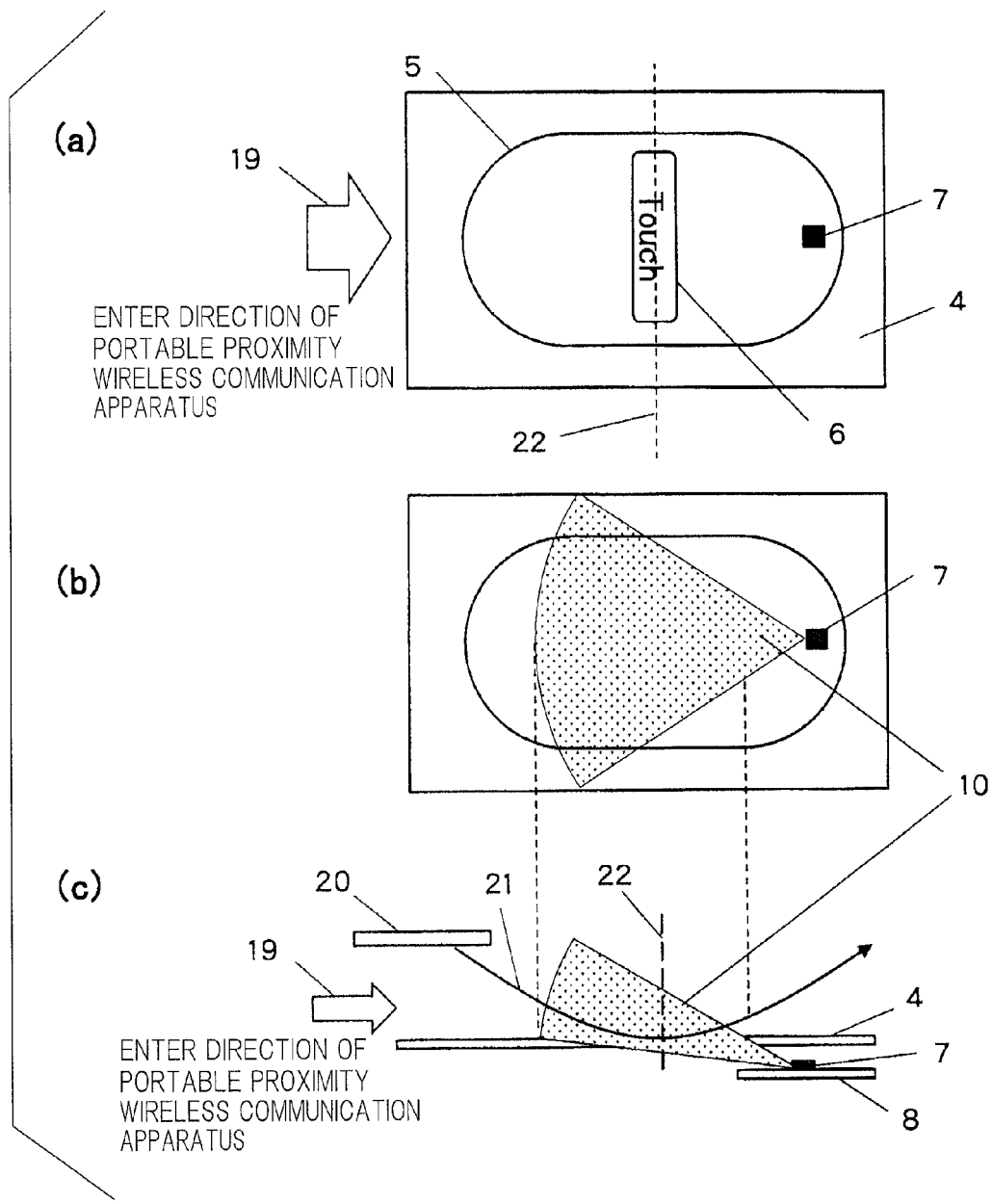
F I G. 9

(a) FRONT FACE (b) REAR FACE
(PLACE-OVER FACE)

(c) REAR FACE
(PLACE-OVER FACE)

(d) SIDE VIEW

STATIONARY PROXIMITY WIRELESS COMMUNICATION APPARATUS, PORTABLE PROXIMITY WIRELESS COMMUNICATION APPARATUS, PROXIMITY WIRELESS COMMUNICATION SYSTEM AND PROXIMITY WIRELESS COMMUNICATION METHOD

CROSS REFERENCE TO RELATED APPLICATIONS

This application is based upon and claims the benefit of priority from the prior Japanese Patent Application No. 2012-272656, filed on Dec. 13, 2012, the entire contents of which are incorporated herein by reference.

FIELD

Embodiments of the present invention relate to a stationary proximity wireless communication apparatus, a portable proximity wireless communication apparatus, a proximity wireless communication system, and a proximity wireless communication method that perform proximity wireless communication.

BACKGROUND

As non-contact wireless communication techniques using a portable device such as an IC card brought in a proximity range, RFID, FeliCa (a registered trademark), NFC (Near Field Communication), TransferJet (a registered trademark), etc. are known. In these techniques, there are wireless communication by electromagnetic induction using a coil, coupler, etc. and wireless communication for transmitting and receiving electromagnetic waves with an antenna of a UHF band and the like.

In wireless communication using a UHF band, a communication distance is relatively long and communication at a distance of several 10 cm or more is possible. Therefore, if the portable device is brought close to a reader at a distance of about 10 cm, stable communication is possible. There are few limitations on antenna installation location in both of the portable device and a reader. Therefore, in readers for using a UHF band, generally, a rough position for placing the portable device is indicated by a mark or the like.

However, in wireless communication using millimeter waves over 40 GHz, a wavelength of a wireless signal is short. Therefore, the size of an antenna becomes very small. Moreover, in a millimeter wave band, generally, directivity is oriented in a specific direction so as to have a high antenna gain.

In this way, in the wireless communication using the millimeter wave band, antenna directivity is extremely high, compared to wireless communication using a UHF band. Therefore, good communication may not be performed if the portable device is placed over at a location shifted from a place-over position displayed on the portable device or the reader.

BRIEF DESCRIPTION OF THE DRAWINGS

FIGS. 6(a) to 6(c) are views showing an example in which electromagnetic waves are emitted obliquely upward;
FIG. 7 is a view showing a main part of a stationary proximity wireless communication apparatus 1 according to a second embodiment;
FIG. 8 is a view showing one modification of FIG. 7;
FIG. 9 is a view showing a main part of a stationary proximity wireless communication apparatus 1 according to a third embodiment;
FIG. 14 is a view showing a portable proximity wireless communication apparatus 30 according to a sixth embodiment, in which
FIG. 14(a) is a front view,
FIG. 14(b) is a rear view,
FIG. 14(c) is a view showing an installation location of an antenna 31 of the portable proximity wireless communication apparatus 30 and an emitting direction in the horizontal plane direction,
and FIG. 14(d) is a view showing an emitting direction from the antenna 31 in the side direction.

DETAILED DESCRIPTION

According to one embodiment, a stationary proximity wireless communication apparatus has an electromagnetic-wave transmitting and receiving part comprising a first indicator that indicates a zone to place a portable proximity wireless communication apparatus and an antenna that is installed in the zone to emit electromagnetic waves having directivity in a direction of a recommended optimum position in the zone suitable to place the portable proximity wireless communication apparatus from a position different from the recommended optimum position, and a wireless communication part configured to perform modulation and demodulation processes of electromagnetic waves transmitted and received at the antenna.

Embodiments will now be explained with reference to the accompanying drawings.

First Embodiment

Figure 1:
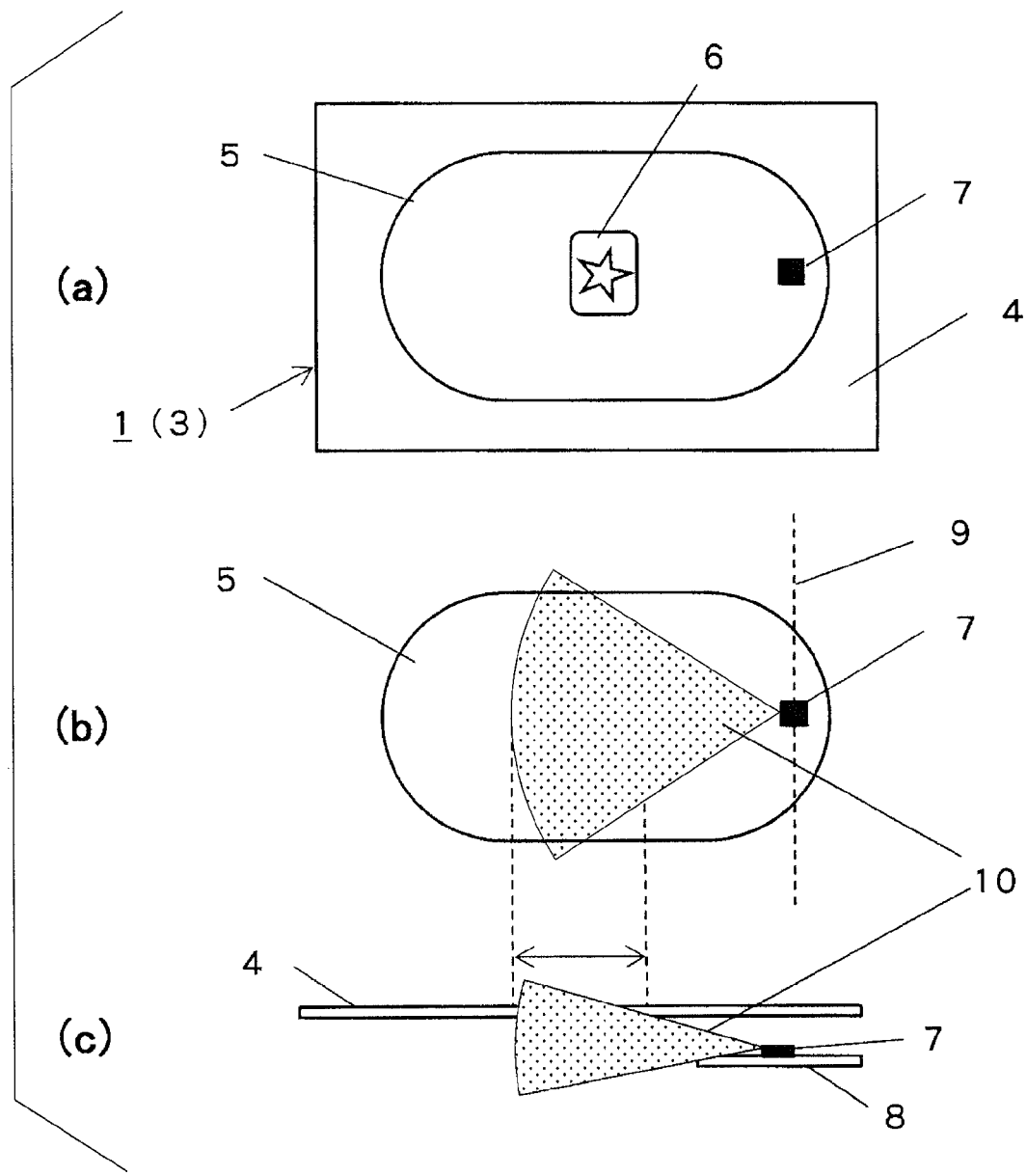
FIGS. 1(a) to 1(c) are views showing a main part of a stationary proximity wireless communication apparatus 1 according to a first embodiment.
Figure 2:
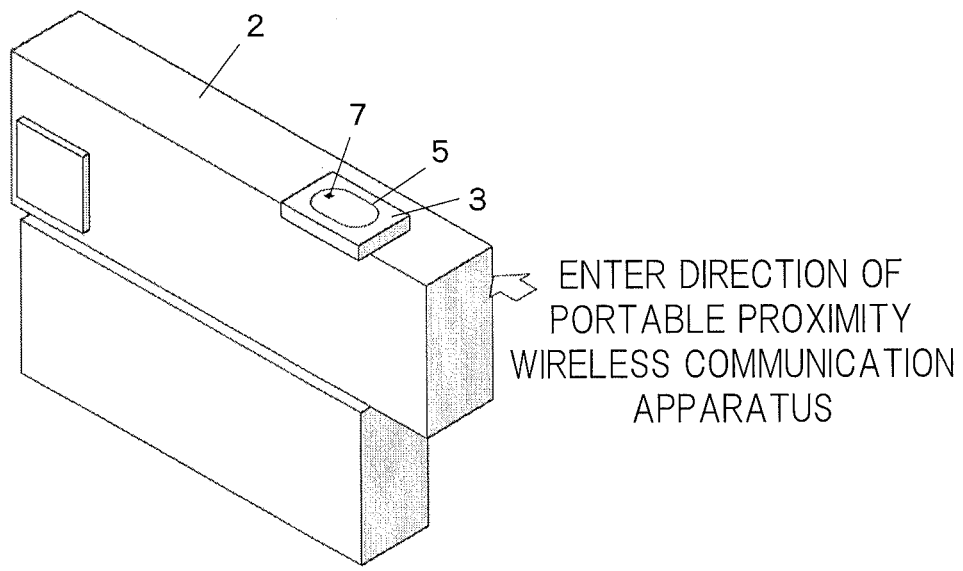
FIG. 2 is a perspective view showing an external appearance of the stationary proximity wireless communication apparatus 1 according to the first embodiment.

FIG. 1 is a view showing a main part of a stationary proximity wireless communication apparatus 1 according to a first embodiment. FIG. 2 is a perspective view showing an outline of the stationary proximity wireless communication apparatus 1 according to the first embodiment.

The stationary proximity wireless communication apparatus 1 of FIG. 1 is installed in a ticket gate system such as a station automatic ticket gate system, for example. FIG. 2 shows an example in which the stationary proximity wireless communication apparatus 1 according to the present embodiment is applied to a ticket gate system 2. The stationary proximity wireless communication apparatus 1 according to the present embodiment is not limited to be applied to the ticket gate system 2, but may be applied to a variety of apparatuses that perform proximity wireless communication.

On the top surface of the stationary proximity wireless communication apparatus 1 of FIG. 2, there is provided an electromagnetic-wave transmitting and receiving part 3 that performs proximity wireless communication with a portable proximity wireless communication apparatus held by a user. FIG. 1 is an enlarged view of the top surface of the electromagnetic-wave transmitting and receiving part 3 shown in FIG. 2. Hereinbelow, the top surface direction of the electromagnetic-wave transmitting and receiving part 3 is referred to as a horizontal plane direction. Moreover, the direction normal to the top surface of the electromagnetic-wave transmitting and receiving part 3 is referred to as a vertical direction.

As shown in FIG. 1(a), on a top surface 4 of the electromagnetic-wave transmitting and receiving part 3, there are provided a track-like or rectangular first indicator 5 and a second indicator 6 provided inside the first indicator 5. The first and second indicators 5 and 6 may be drawn in different colors on the top surface 4 of the electromagnetic-wave transmitting and receiving part 3. Or the first and second indicators 5 and 6 may be a thin film material, such as a seal, adhered to the top surface 4 of the electromagnetic-wave transmitting and receiving part 3.

The first indicator 5 is provided to make a user recognize a zone for placing a portable proximity wireless communication apparatus. The second indicator 6 is provided to make a user recognize a recommended optimum position for placing a portable proximity wireless communication apparatus. The actual display form of the first and second indicators 5 and 6 may not be limited to any particular one. The first and second indicators 5 and 6 may be distinguished by a border line only or different colors inside the indicators. Or the first and second indicators 5 and 6 may be different marks distinguished from each other.

The second indicator 6 is displayed so that a user can easily recognize a recommended position by means of, for example, a star mark such as shown in FIG. 1(a). The second indicator 6 may be displayed with letters such as "Touch", instead of a mark. Moreover, the second indicator 6 may be displayed by illumination equipment such as an LED to be turned on and off, instead of a mark.

In the example of FIG. 1(a), although the star mark is surrounded by a rectangular line, this line is not essential. Moreover, although the size and shape of the second indicator 6 are arbitrary, it is necessary to select size and shape for stably receiving electromagnetic waves. This is because when a portable proximity wireless communication apparatus is placed over the second indicator 6, it is intended that the apparatus can stably receive electromagnetic waves from an antenna 7 installed in the stationary proximity wireless communication apparatus 1.

When a user places a portable proximity wireless communication apparatus over the second indicator 6, the portable proximity wireless communication apparatus may be contacted with the second indicator 6 or placed over the second indicator 6 with a small distance. When wireless communication with the portable proximity wireless communication apparatus is successful, it may be indicated by the first indicator 5 or notified to a user with sounds.

In the present embodiment, as shown in FIG. 1(a), the antenna 7 is installed inside the first indicator 5 but apart from the second indicator 6 inside the first indicator 5. The antenna 7 emits electromagnetic waves that have directivity in the direction of the second indicator 6. Therefore, when a user places a portable proximity wireless communication apparatus over the second indicator 6, it is possible to stably receive electromagnetic waves from the antenna 7.

FIG. 1(b) is a view showing a direction 10 of electromagnetic waves emitted from the antenna 7 of the stationary proximity wireless communication apparatus 1. As shown, the antenna 7 emits electromagnetic waves roughly in a fan-like shape having a maximum gain roughly in the direction of the center of the fan. Therefore, it is preferable to set an installation location of the antenna 7 so that the direction in which the electromagnetic waves emitted from the antenna 7 have a maximum gain and the direction of the second indicator 6 roughly match each other.

FIG. 1(c) is a view showing a direction 10 of electromagnetic waves emitted from the antenna 7 in the vertical direction of the electromagnetic-wave transmitting and receiving part 3. As shown, the antenna 7 is installed on a surface 8 that is located beneath the top surface 4 of the electromagnetic-wave transmitting and receiving part 3. From this location, electromagnetic waves are also emitted in the vertical direction within a specific acute angular range. Accordingly, even though the antenna 7 is installed under the top surface 4 of the electromagnetic-wave transmitting and receiving part 3, electromagnetic waves are emitted also above the top surface 4 of the electromagnetic-wave transmitting and receiving part 3. Therefore, a portable proximity wireless communication apparatus placed over the top surface 4 of the electromagnetic-wave transmitting and receiving part 3 can stably receive electromagnetic waves.

In the present embodiment, proximity wireless communication is performed by using electromagnetic waves, for example, in the range from 40 GHz to 80 GHz, that is, millimeter waves. Because of high transfer speed, high straightness and high propagation loss of millimeter waves, wireless communication in a millimeter wave band has a feature in that secure communication can be performed with rare interception from a third party. On the other hand, it is general for wireless communication in a millimeter wave band to have higher antenna gain by using an antenna of higher directivity in either or both of transmission and reception in order to have enough receiving power for stable communication. Therefore, there is a disadvantage in that wireless communication in a millimeter wave band has a higher directivity than known proximity wireless communication. For the reason above, in the present embodiment, as described above, the installation location of the antenna 7 of the stationary proximity wireless communication apparatus 1 is arranged at a specific location to achieve stable wireless communication with a portable proximity wireless communication apparatus.

Figure 3:
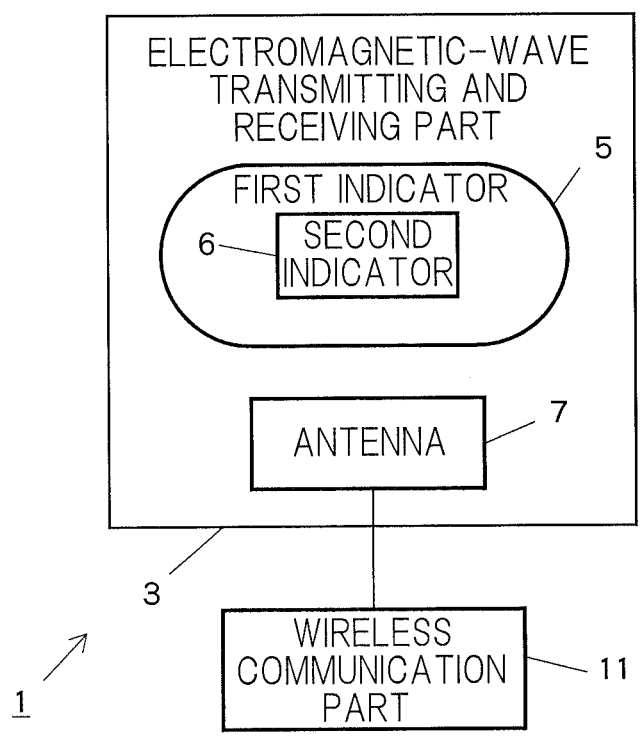
FIG. 3 is a block diagram showing the configuration of the main part of the stationary proximity wireless communication apparatus 1 according to the first embodiment.

FIG. 3 is a block diagram showing the configuration of the main part of the stationary proximity wireless communication apparatus 1 according to the first embodiment. The stationary proximity wireless communication apparatus 1 of FIG. 3 has an electromagnetic-wave transmitting and receiving part (a first electromagnetic-wave transmitting and receiving part) 3 having a built-in antenna (a first antenna) 7 and a wireless communication part (a first wireless communication part) 11. The wireless communication part 11 performs modulation and demodulation processes to electromagnetic waves transmitted and received at the antenna 7.

Figure 4:
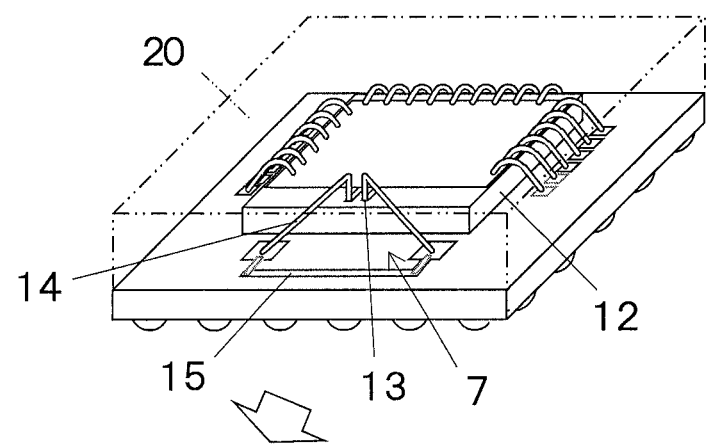
FIG. 4 is a view showing one example of an IC chip 12.

At least part of the electromagnetic-wave transmitting and receiving part 3, and the wireless communication part 11 can be integrated into an IC chip. For example, FIG. 4 is a view showing one example of an IC chip 12 of such IC chip type. FIG. 4 shows one example of an IC chip 12 having a built-in antenna 7 that is formed using bonding wires in the IC chip 12.

In FIG. 4, a loop antenna 7 is formed with differential feed lines 13 formed on the upper surface of an IC chip 12 having a built-in wireless communication part 11, two wires 14 that extend left and right from the differential feed lines 13, and a metal part 15 that connects the tips of the two wires 14 with each other on a dielectric substrate. The range and direction of directivity of the loop antenna 7 can be changed by adjusting the inclination angle of the wires 14, the distance between the wires 14, etc. The wires 14 are made of the same material as the bonding wires. In FIG. 4, the IC chip 12, the wires 14, and the antenna 7 are installed in the same package 20.

Figure 5:
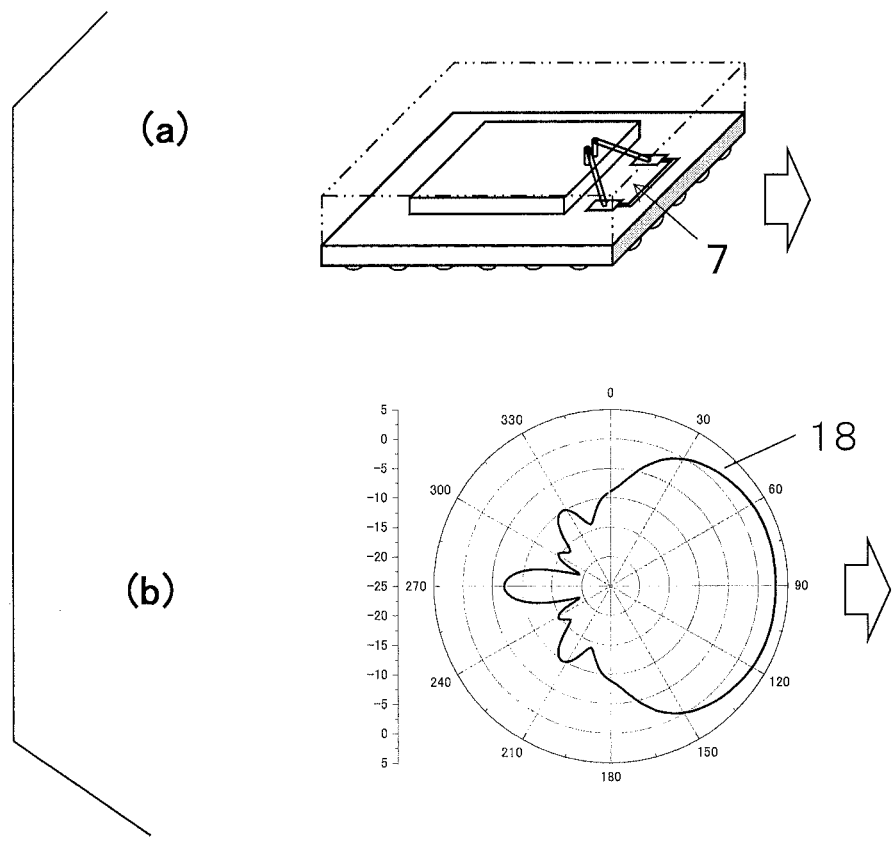
FIGS. 5(a) and 5(b) are views showing an example of a result of simulation of directivity of a loop antenna 7 of FIG. 4.

FIG. 5 is a view showing an example of a simulation result of directivity of the loop antenna 7 in FIG. 4. As shown in FIG. 5(*a*), when the antenna 7 is installed at the left side face, its directivity is shown in a range 18 in the direction of the left side face of the IC chip 12, as shown in FIG. 5(*b*). Therefore, electromagnetic waves can be emitted in the direction of the installation surface of the IC chip 12.

In the present embodiment, the antenna 7 built into the IC chip 12 such as shown in FIG. 5 is installed at a location shown in FIG. 1(*b*) so as to have a maximum gain for the directivity of electromagnetic waves on the second indicator 6 side (the left side of a dot line 9 in FIG. 1(*b*)). Depending on the use mode, strictly speaking, the maximum gain of electromagnetic waves emitted from the antenna 7 may not be given in the direction of the second indicator 6. However, it is at least required that the directivity of the antenna 7 in the horizontal plane direction be oriented toward the second indicator 6 side from the location of the antenna 7. In other words, the directivity of the antenna 7 is required to be oriented toward the left side of the dot line 9 that passes through the antenna 7 in FIG. 1(*b*).

It is general for a known stationary proximity wireless communication apparatus 1 to have directivity in the normal direction from the top surface 4 of the electromagnetic-wave transmitting and receiving part 3 for emitting electromagnetic waves. By contrast, the stationary proximity wireless communication apparatus 1 according to the present embodiment uses a loop antenna 7 such as shown in FIG. 5 to emit electromagnetic waves in the direction along the top surface 4 of the electromagnetic-wave transmitting and receiving part 3, as shown in FIGS. 1(*b*) and 1(*c*). This is because the present embodiment intends to perform wireless communication with millimeter waves. And due to high directivity, the directivity of electromagnetic waves is oriented toward the second indicator 6 from the antenna 7 so as to achieve stable wireless communication when a portable proximity wireless communication apparatus is placed over the second indicator 6.

The emission direction of electromagnetic waves from the antenna 7 in the present embodiment may not always necessary be roughly parallel with the top surface 4 of the electromagnetic-wave transmitting and receiving part 3. As shown in FIG. 6, the emission direction of electromagnetic waves from the antenna 7 may be inclined to the horizontal plane direction by a specific acute angle. The antenna 7 is installed under the top surface 4 of the electromagnetic-wave transmitting and receiving part 3. Therefore, when electromagnetic waves are emitted from the antenna 7 in the direction roughly parallel with the horizontal plane direction, the field intensity at the second indicator 6 may not always be maximum. For this reason, as shown in FIG. 6(*c*), by emitting electromagnetic waves obliquely upward in the direction of the second indicator 6 from the antenna 7, it is possible to have higher field intensity at the second indicator 6 to perform more stable wireless communication.

In the example of FIG. 6, the emission angle of electromagnetic waves is inclined in the vertical direction of the electromagnetic-wave transmitting and receiving part 3. The emission angle of electromagnetic waves in the horizontal plane direction shown in FIG. 6(*b*) is similar to that of FIG. 1(*b*). The installation location of the antenna 7 shown in FIG. 6(*a*) is similar to that of FIG. 1(*a*).

As described above, in the first embodiment, the second indicator 6 is provided inside the first indicator 5 and electromagnetic waves are emitted in the direction of the second indicator 6 from the antenna 7 installed within the zone of the first indicator 5 but at a location different from the location of the second indicator 6. Therefore, when a user places a portable proximity wireless communication apparatus over the second indicator 6, it is possible to stably receive electromagnetic waves from the antenna 7. Accordingly, it is possible to perform stable wireless communication even if electromagnetic waves of extremely high directivity, such as millimeter waves, is used.

Second Embodiment

In a second embodiment which will be described below, the second indicator 6 is omitted.

FIG. 7 is a view showing a main part of a stationary proximity wireless communication apparatus 1 according to the second embodiment. FIG. 8 is a view showing one modification of FIG. 7. The stationary proximity wireless communication apparatuses 1 of FIGS. 7 and 8 are identical to those of FIGS. 1 and 6 described above, respectively, except that the second indicator 6 is omitted.

It is assumed that, when a user visually recognizes the first indicator 5, the user recognizes that a position around the center of the first indicator 5 is the position where a portable proximity wireless communication apparatus is to be placed over, as a tacit understanding. Under this assumption, the second indicator 6 is omitted in the present embodiment.

An antenna 7 of the present embodiment is installed at a location within the zone of the first indicator 5 but apart from the center position of the first indicator 5 (FIG. 7(*a*) and FIG. 8(*a*)). And the antenna 7 emits electromagnetic waves toward the center position of the first indicator 5 (FIG. 7(*b*) and FIG. 8(*b*)). More preferably, the antenna 7 emits electromagnetic waves so as to have maximum field intensity in the center direction of the first indicator 5. It is at least required that the directivity of electromagnetic waves be oriented close to the center of the first indicator 5 from the antenna 7 (the left side of a dot line 9 of FIG. 7(*b*) and FIG. 8(*b*)).

Moreover, the antenna 7 may emit electromagnetic waves in parallel with the horizontal plane as shown in FIG. 7(*c*) or in a specific acute angular direction, that is, obliquely upward as shown in FIG. 8(*c*)

As described, in the second embodiment, since the second indicator 6 is omitted, the display mode on the top surface 4 of the electromagnetic-wave transmitting and receiving part 3 is simplified. Even though the second indicator 6 is omitted, an ordinary user recognizes that a position around the center of the first indicator 5 is the position where a portable proximity wireless communication apparatus is to be placed over. Therefore, by orienting the directivity of electromagnetic waves from the antenna 7 around the center of the first indicator 5, stable wireless communication is possible.

When the second indicator 6 is omitted, as described in the second embodiment, while visually recognizing the first indicator 5, a user visually measures the center position of the first indicator 5 and places a portable proximity wireless communication apparatus over the measured position. Accordingly, compared to the case in which there is the second indicator 6, it is expected that an actual user's place-over position changes very much. Therefore, it is preferable that a user can perform stable wireless communication even if the user places a portable proximity wireless communication apparatus over a position different from an intended position to a certain degree. Accordingly, it is preferable that, as shown in FIG. 8, the antenna 7 emits electromagnetic waves obliquely upward to enhance the field intensity in a relatively wide area around the center of the first indicator 5.

Third Embodiment

In a third embodiment which will be explained below, not only the position over which a portable proximity wireless communication apparatus is to be held up, but also a direction in which a portable proximity wireless communication apparatus is to be placed over is notified to a user.

FIG. 9 is a view showing a main part of a stationary proximity wireless communication apparatus 1 according to the third embodiment. In FIG. 9, English letter information "Touch" is displayed as the second indicator 6. The English letter information indicates a place-over position. The direction of the English letter information, that is, the direction of the top of each English letter indicates a place-over direction. In this case, a user places a portable proximity wireless communication apparatus 30 in the direction of an arrow 19 in FIG. 9. Even though there is no direction sign such as an arrow mark that indicates a place-over direction on the top surface 4 of the electromagnetic-wave transmitting and receiving part 3, a user can recognize the place-over direction by referring to the direction indicated by the English letter information.

In FIG. 9, only the English letter information is used as the second indicator 6. However, a mark such as a star mark that is part of the first indicator 5 may be applied at the center position of the English letter information. Or instead of the English letter information, a mark such as an arrow that indicates a place-over direction may only be used as the second indicator 6.

Moreover, in FIG. 9, the antenna 7 is installed at a location apart from a center line 22 of the second indicator 6. Form this location, the antenna 7 emits electromagnetic waves in a direction opposite to the direction in which a portable proximity wireless communication apparatus 30 is to be held up, that is, the direction toward the center line 22. With this arrangement, as shown in FIG. 9(b), a user enters in a direction facing electromagnetic waves from the antenna 7 that spread in the horizontal plane direction and places a portable proximity wireless communication apparatus 30. Therefore, it is easier to receive the electromagnetic waves from the antenna 7.

The same is applied to the vertical direction. When a user takes a place-over action, the user's portable proximity wireless communication apparatus 30 passes, along an arrow 21 in FIG. 9(c), through a zone where electromagnetic waves from the antenna 7 are spreading in the vertical direction and then passes along the side of the stationary proximity wireless communication apparatus 1.

As described above, in the third embodiment, the antenna 7 is installed at the opposite of the direction in which a user places the portable proximity wireless communication apparatus 30, to emit electromagnetic waves in a direction toward a user's entering direction. This results in that a user places the portable proximity wireless communication apparatus 30 in a direction in which emitted electromagnetic waves are spreading, thereby stable wireless communication being possible.

Fourth Embodiment

In a fourth embodiment which will be explained below, information that indicates a direction in which a user is to place a portable proximity wireless communication apparatus 30 is displayed outside the zone of the first indicator 5.

Figure 10:
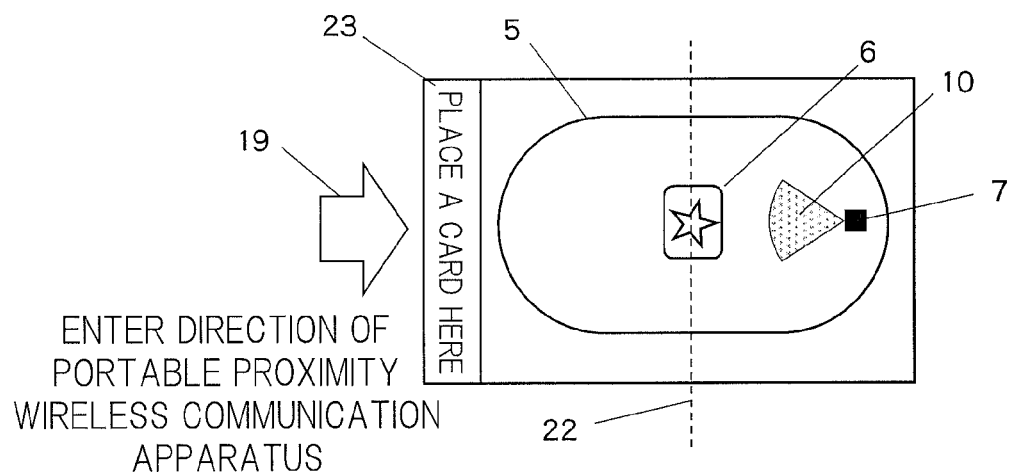
FIG. 10 is a view showing a main part of a stationary proximity wireless communication apparatus according to a fourth embodiment.

FIG. 10 is a view showing a main part of a stationary proximity wireless communication apparatus according to the fourth embodiment. In FIG. 10, character information 23 such as "place a card here" is displayed outside the zone of the first indicator 5. The direction indicated by this character information is the direction in which a user is to place the portable proximity wireless communication apparatus 30. While entering in this direction, the user places the portable proximity wireless communication apparatus 30.

In FIG. 10, a mark such as a star mark is used as the first indicator 5. Similar to FIG. 9, the antenna 7 is installed so that electromagnetic waves spread in an emission direction 10 opposite of the direction in which a user is to place the portable proximity wireless communication apparatus 30. With this arrangement, a user places the portable proximity wireless communication apparatus 30 in a direction toward the emission direction 10 in which electromagnetic waves spread, thereby stable wireless communication being possible.

Figure 11:
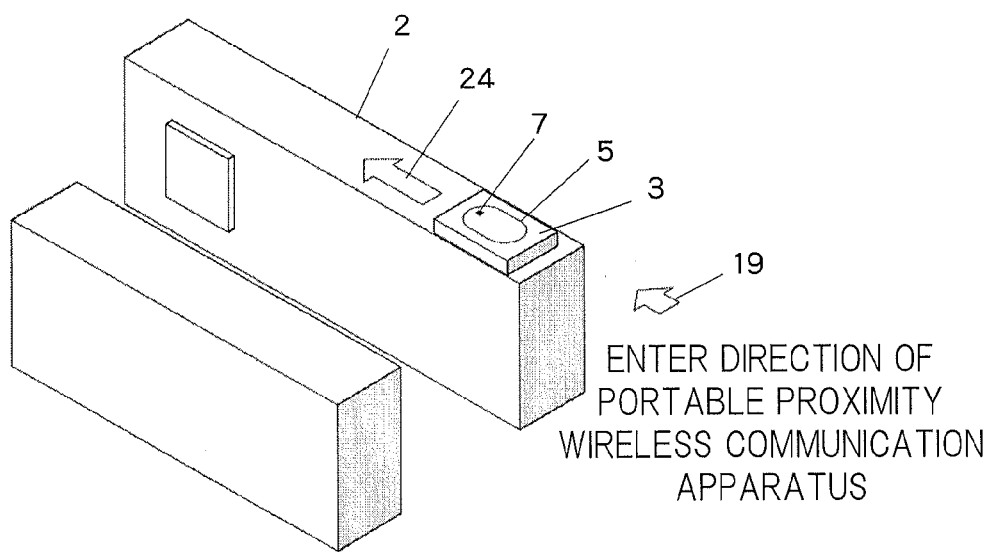
FIG. 11 is a view showing one modification of FIG. 10.

FIG. 11 is a view showing one modification of FIG. 10. FIG. 11 shows an example in which the stationary proximity wireless communication apparatus of FIG. 10 is applied to a ticket gate system 2 such as a station automatic ticket gate system. In the example of FIG. 11, an arrow mark 24 that indicates a user's entering direction is displayed outside the zone of the first indicator 5. In this example, the antenna 7 is installed so that electromagnetic waves are emitted and spread in the opposite direction of the user's entering direction.

In the example of FIG. 11, like shown in FIG. 10, character information 23 such as "place a card here" may be displayed outside the zone of the first indicator 5 or omitted.

As described above, in the fourth embodiment, a display is provided outside the zone of the first indicator 5 to indicate at least either a user's entering direction or a direction in which a portable proximity wireless communication apparatus 30 is to be held up. And the antenna 7 is installed so that electromagnetic waves are emitted and spread in the opposite direction of a direction in which a user is to place the portable proximity wireless communication apparatus 30 in accordance with the display mentioned above. Therefore, stable wireless communication is possible.

Fifth Embodiment

A feature of a fifth embodiment lies in the configuration of a portable proximity wireless communication apparatus 30 that can communicate with the stationary proximity wireless communication apparatus 1 explained in the first to fourth embodiments.

Figure 12:
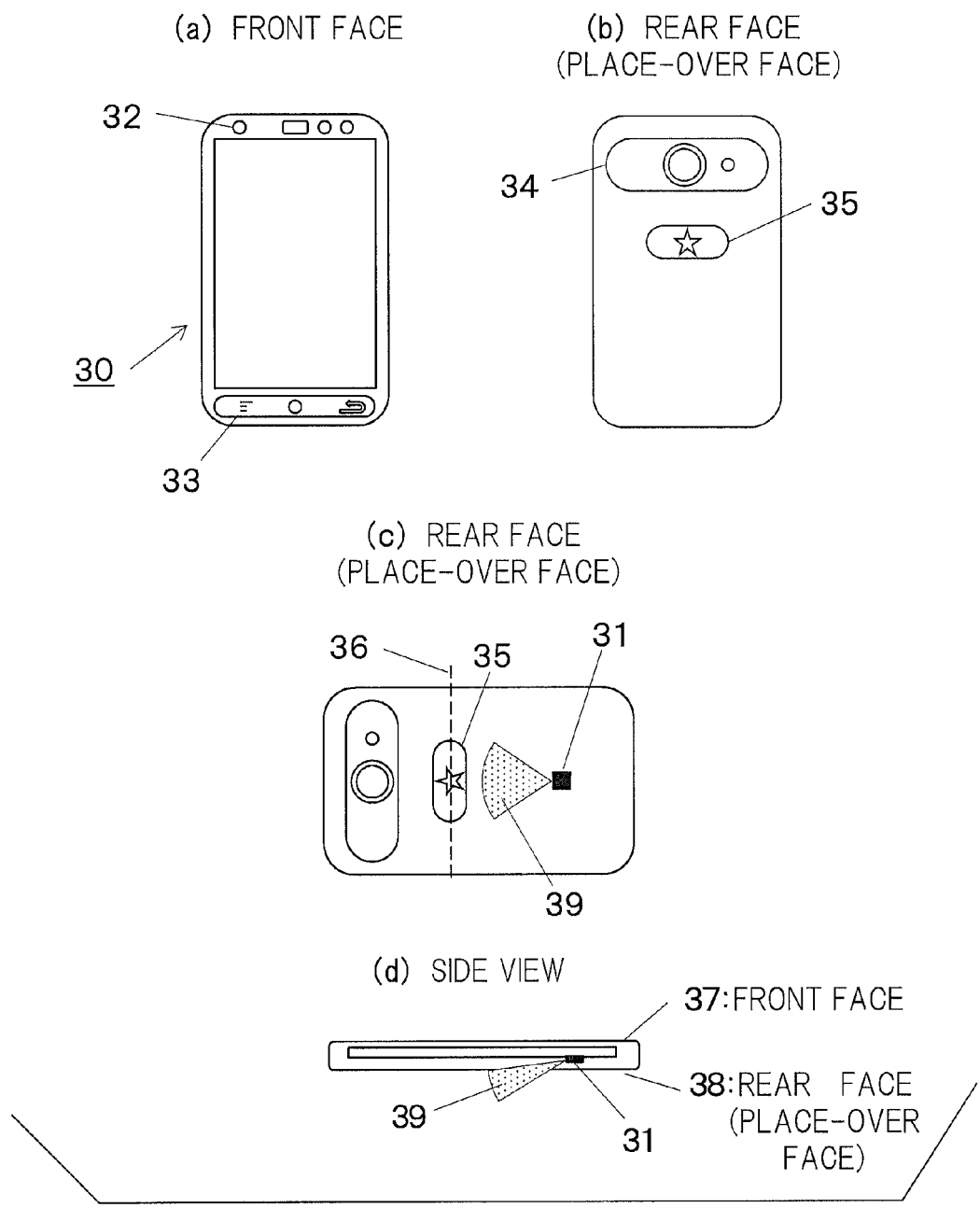
FIGS. 12(a) to 12(d) are views showing a portable proximity wireless communication apparatus 30 according to a fifth embodiment.

FIG. 12 is a view showing the portable proximity wireless communication apparatus 30 according to the fifth embodiment. FIG. 12 shows an example of application to a smartphone. FIG. 12(a) is a front view. FIG. 12(b) a rear view. FIG. 12(c) is a view showing the installation location of an antenna 31 of the portable proximity wireless communication apparatus 30 and an emitting direction in the horizontal plane direction. FIG. 12(d) is a view showing an emitting direction from the antenna 31 in the side direction of the portable proximity wireless communication apparatus 30. Hereinbelow, a touch-panel control face (a display panel face) of the portable proximity wireless communication apparatus 30 is referred to as a front face and its opposite face is referred to as a rear face.

In the portable proximity wireless communication apparatus 30 of FIG. 12, a camera 32 and the like are arranged in the upper side of the front face and an operation key 33 and the like are arranged in the lower side thereof. The front face of the portable proximity wireless communication apparatus 30 is formed in a shape by which a user can recognize the top and bottom. A camera 34 is installed in the upper side of the rear face of the portable proximity wireless communication apparatus 30. The rear face of the portable proximity wireless communication apparatus 30 is also formed in a shape by which a user can recognize the top and bottom.

Moreover, an indicator 35 that indicates a place-over position is provided on the rear face of the portable proximity wireless communication apparatus 30. In the example of FIG. 12(b), an ellipse mark having a star mark at its center is used as the indicator 35. However, there is no particular limitation to the indicator 35 concerning how it is displayed.

As shown in FIG. 12(c), an antenna 31 is installed in a location different from the indicator 35. The antenna 31 emits electromagnetic waves having directivity in the direction of the indicator 35. In more detail, the antenna 31 is installed in a location out of a center line 36 in the longitudinal direction of the indicator 35 to emit electromagnetic waves in the direction of this center line 36. Moreover, as shown in FIG. 12(d), the antenna 31 emits electromagnetic waves obliquely downward from the rear face.

It is intended for the portable proximity wireless communication apparatus 30 of FIG. 12 that, while a user is holding it with its front face up and the upper side of the front face orienting in a user's entering direction, the user holds it with the indicator 35 on the rear face over a place-over position on the stationary proximity wireless communication apparatus 1.

Figure 13:
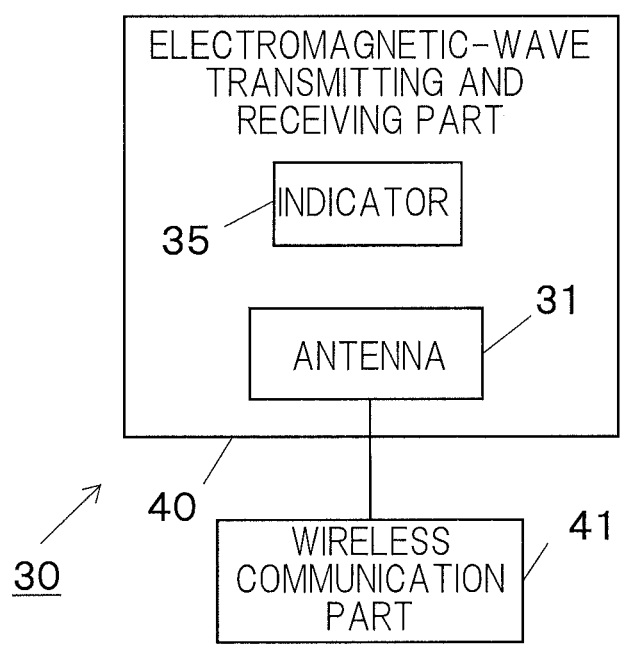
FIG. 13 is a block diagram showing the configuration of a main part of the portable proximity wireless communication apparatus 30.

FIG. 13 is a block diagram showing the configuration of a main part of the portable proximity wireless communication apparatus 30. The portable proximity wireless communication apparatus 30 of FIG. 13 has an electromagnetic-wave transmitting and receiving part (a second electromagnetic-wave transmitting and receiving part) 40 having a built-in antenna 31 and a wireless communication part (a second wireless communication part) 41. The wireless communication part 41 performs modulation and demodulation processes to electromagnetic waves transmitted and received at the antenna 31.

The electromagnetic-wave transmitting and receiving part 40 has an indicator 35 that indicates a recommended position at which the portable proximity wireless communication apparatus 30 is to be placed over an indicated position on the stationary proximity wireless communication apparatus 1. The electromagnetic-wave transmitting and receiving part 40 also has an antenna (a second antenna) 31 installed in a location out of the indicator 35 to emit electromagnetic waves having directivity in the direction of the indicator 35.

The portable proximity wireless communication apparatus 30 of FIG. 12 is not provided with anything that corresponds to the first indicator 5 of the stationary proximity wireless communication apparatus 1 of FIG. 1. This is because, a user recognizes that the opposite face of the touch-panel operation face is the face at which the portable proximity wireless communication apparatus 30 is to be held up, as a tacit understanding.

The portable proximity wireless communication apparatus 30 of FIG. 12 is provided with the indicator 35 that corresponds to the second indicator 6 of FIG. 1 around the center of the rear face. Since there are other components such as a camera on the rear face, the indicator 35 is provided at a location that does not obstruct the other components. It is most appropriate to provide the indicator 35 in a direction in which electromagnetic waves from the antenna 31 have a maximum gain. As far as the direction in which the indicator 35 is provided is the direction in which electromagnetic waves from the antenna 31 have a maximum gain, the indicator 35 can be provided at a location out of the center of the rear face.

The portable proximity wireless communication apparatus 30 may be used while it is put in an opaque protection cover that covers the entire rear face. In this case, although provided at the rear face, the indicator 35 cannot be visually recognized from outside due to being covered with a protection cover. However, generally, even once human beings view the indicator 35 on the rear face, they remember it and recognize the rear face as a place-over face, even if the indicator 35 cannot be seen. Therefore, it is considered that the indicator 35 provided on the rear face has some effects.

Or it is supposed that the portable proximity wireless communication apparatus 30 becomes widespread and most people in the world become familiar with a place-over action. In this case, it is expected that, even if there is no indicator 35 at all, people naturally places the portable proximity wireless communication apparatus 30 with the center part of the rear face. Therefore, it is not always necessary to provide the portable proximity wireless communication apparatus 30 with the indicator 35.

In FIG. 12(d), the directivity of the antenna 31 in the side direction is oriented obliquely downward from the rear face. However, the antenna 31 may emit electromagnetic waves in a direction roughly parallel with the rear face as far as the distance between the antenna 31 and the rear face is very short.

As described above, in the fifth embodiment, users mostly place the portable proximity wireless communication apparatus 30 over the stationary proximity wireless communication apparatus 1, with the front face up and the upper side of the front face oriented in the user's entering direction. Therefore, by installing the antenna 31 under consideration of the user place-up action, it is possible to perform stable wireless communication with the stationary proximity wireless communication apparatus 1.

Sixth Embodiment

There are apparatuses among portable proximity wireless communication apparatuses 30 for which it is totally impossible to distinguish between the top and bottom. Especially, if the entire front face is a touch panel with no physical buttons, camera, etc., it is impossible to distinguish between the top and bottom unless a screen is displayed. The sixth embodiment which will be explained below is intended to be applied to a portable proximity wireless communication apparatus 30 for which it is impossible to distinguish between the top and bottom.

Figure 14:
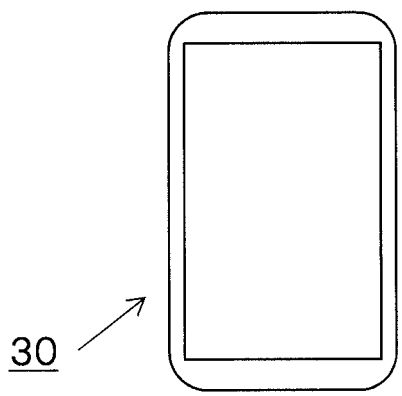
Figure 14:
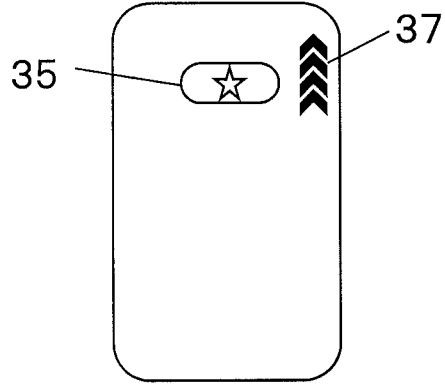
Figure 14:
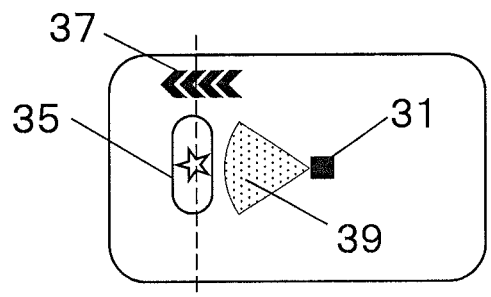
Figure 14:
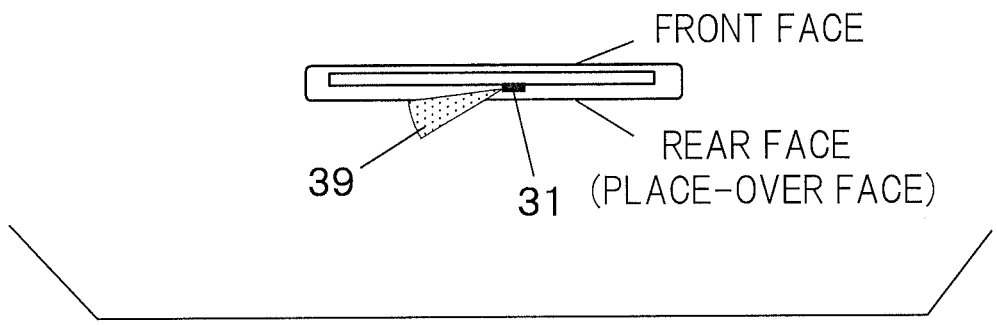

FIG. 14 is a view showing the portable proximity wireless communication apparatus 30 according to the sixth embodiment. FIG. 14(*a*) is a front view. FIG. 14(*b*) is a rear view. FIG. 14(*c*) is a view showing the installation location of an antenna 31 of the portable proximity wireless communication apparatus 30 and an emitting direction in the horizontal plane direction. FIG. 14(*d*) is a view showing an emitting direction from the antenna 31 in the side direction.

In the portable proximity wireless communication apparatus 30 of FIG. 14, there is no component on both of the front and rear faces that distinguishes between the top and bottom. For this reason, around the indicator 35 that indicates a place-over position, there is another indicator 37 that indicates a place-over direction. The indicator 37 is displayed in the form of arrow, as shown in FIG. 14(*b*). The direction indicated by the arrow is the place-over direction.

In this case, as shown in FIG. 14(*c*), an antenna 31 is installed in the direction of the arrowhead of the arrow and electromagnetic waves are emitted from antenna 31 in the direction of the place-over position. In the side direction, the antenna 31 emits electromagnetic waves in the direction obliquely downward from the rear face.

A user takes a place-over action in the direction of the arrow on the rear face of the portable proximity wireless communication apparatus 30. Accordingly, the antenna 31 of the portable proximity wireless communication apparatus 30 emits electromagnetic waves in the place-over direction. Therefore, if the antenna 31 of the stationary proximity wireless communication apparatus 1 is installed in the place-over direction, stable wireless communication can be performed between them.

As described above, in the sixth embodiment, when there is no component with which a user can recognize a place-over direction on both sides of the front and rear faces of the portable proximity wireless communication apparatus 30, the indicator 37 that indicates the place-over direction is provided at least on the rear face. Therefore, a user who views the indicator 37 can easily recognize the place-over direction, and hence it is possible to perform stable wireless communication with the stationary proximity wireless communication apparatus 1.

Seventh Embodiment

In the first to sixth embodiments described above, the examples in which only one antenna, that is the antenna 7 or 31, is installed in the stationary proximity wireless communication apparatus 1 or the portable proximity wireless communication apparatus 30. However, a plurality of antennas 7 or 31 may be installed to emit electromagnetic waves in different directions.

Figure 15:
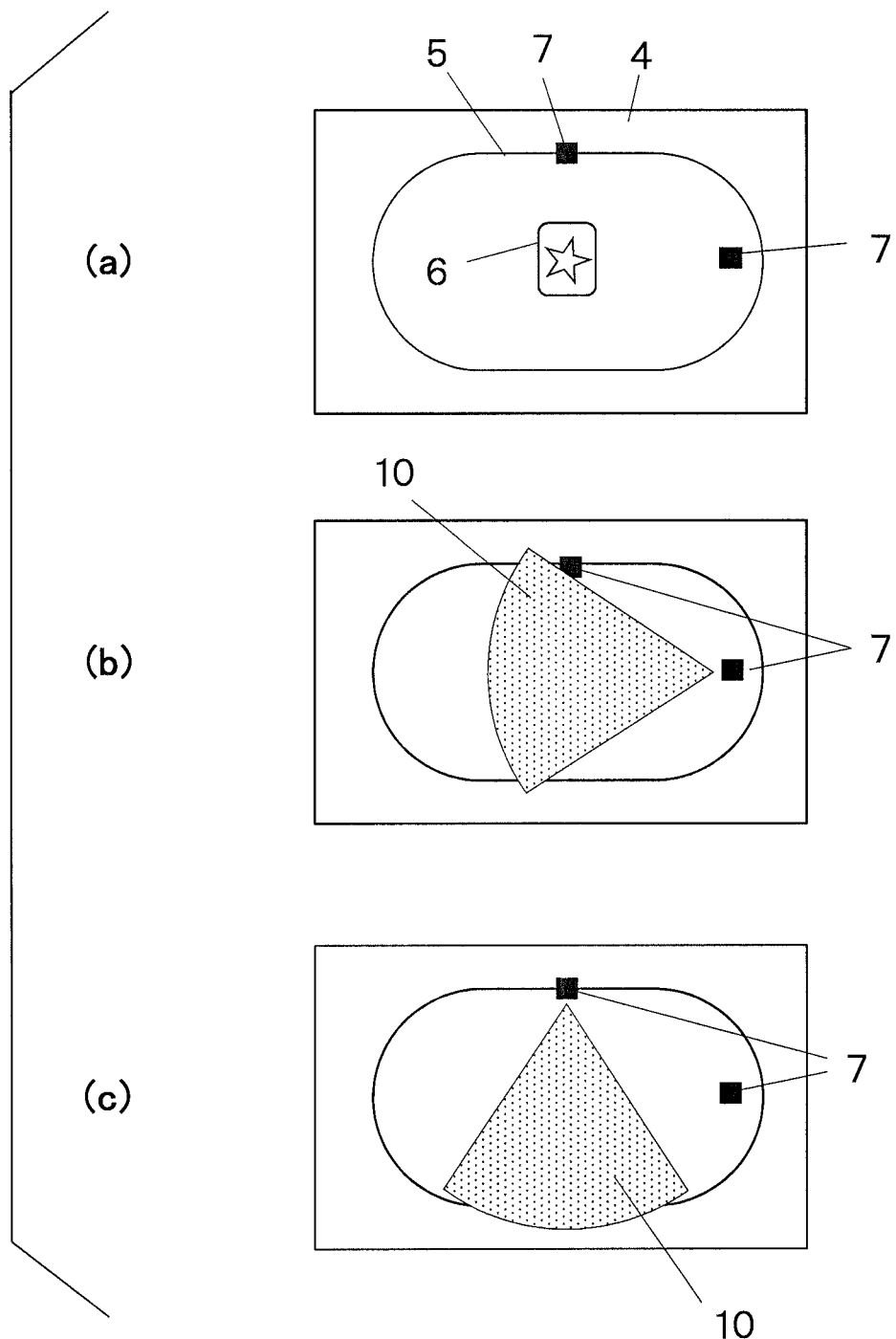
FIG. 15 shows an example in which two antennas 7 that emit electromagnetic waves in directions different by 90 degrees are installed in the stationary proximity wireless communication apparatus 1.
Figure 16:
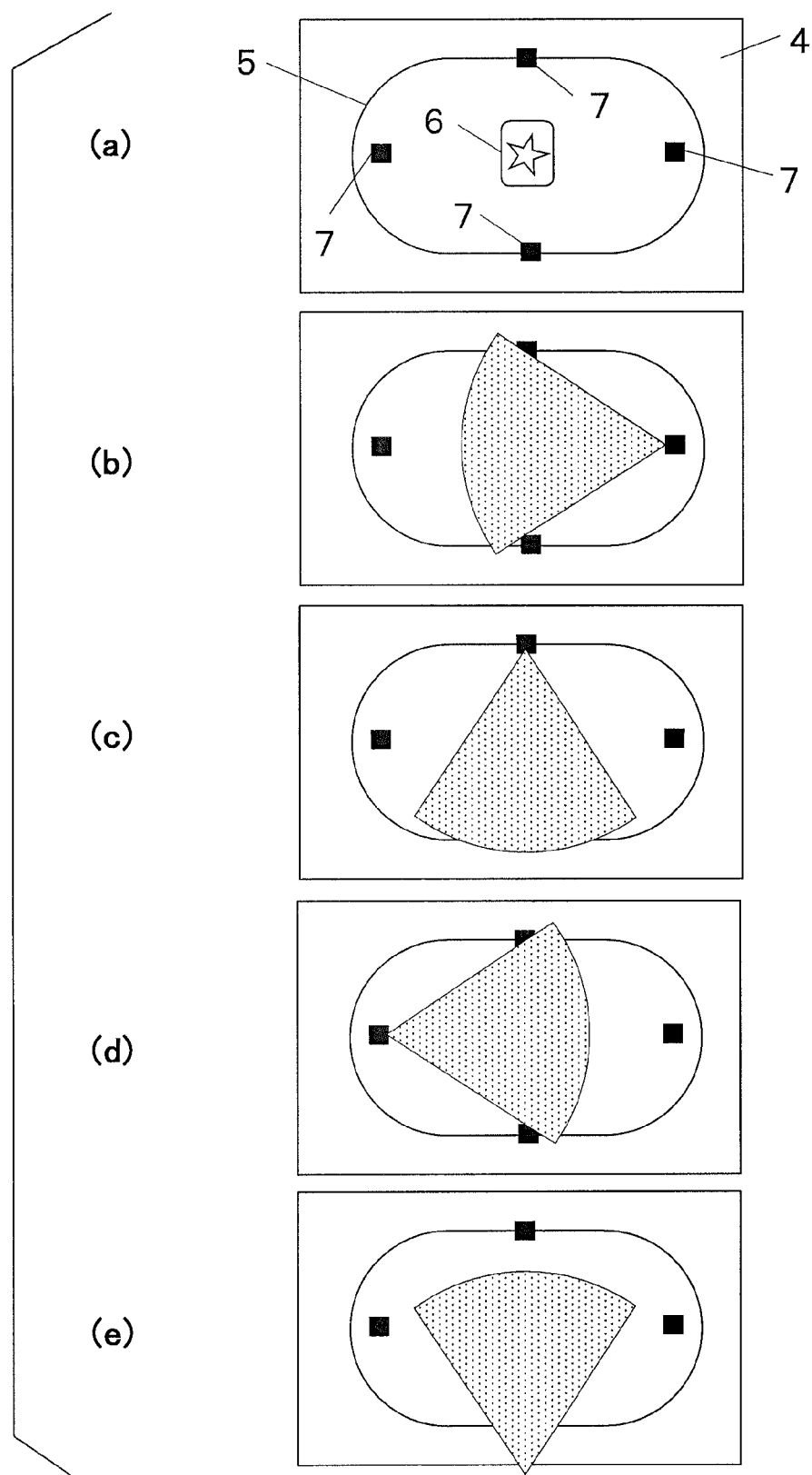
FIG. 16 shows an example in which four antennas 7 that emit electromagnetic waves in directions different by 90 degrees are installed in the stationary proximity wireless communication apparatus 1.

FIG. 15 shows an example in which two antennas 7 that emit electromagnetic waves in directions different by 90 degrees are installed in the stationary proximity wireless communication apparatus 1. FIG. 16 shows an example in which four antennas 7 that emit electromagnetic waves in directions different by 90 degrees are installed in the stationary proximity wireless communication apparatus 1.

FIGS. 15 and 16 show examples of arrangement of antennas 7 of the stationary proximity wireless communication apparatus 1. Antennas 31 of the portable proximity wireless communication apparatus 30 may also be arranged like FIG. 15 or 16.

FIG. 15(*a*) shows an example in which one antenna 7 and another antenna 7 are arranged at a long side and a short side of a track-like first indicator 5, respectively. FIG. 15(*b*) shows an emission range of electromagnetic waves emitted by the antenna 7 at the long side. FIG. 15(*c*) shows an emission range of electromagnetic waves emitted by the antenna 7 at the short side. All of the electromagnetic waves from these two antennas 7 are emitted in the direction of the second indicator 6.

FIG. 16(*a*) shows an example in which two antennas 7 and other two antennas 7 are arranged at long sides and short sides of a track-like first indicator 5, respectively. FIGS. 16(*b*) to 16(*e*) show emission ranges of electromagnetic waves emitted by these antennas 7. All of the electromagnetic waves from these four antennas 7 are emitted in the direction of the second indicator 6.

Basically, directivity is high in millimeter wave communication. Therefore, if there is only one antenna 7, depending on the installation location of the indicator 35 (the second indicator 6), electromagnetic waves may not reach enough to the installation location. Moreover, the portable proximity wireless communication apparatus 30 may not always be placed over from an intended direction. For example, suppose that an antenna 7 that has directivity of emission such as shown in FIG. 15(*b*) is only installed in the stationary proximity wireless communication apparatus 1. In this case, when the portable proximity wireless communication apparatus 30 is placed in the opposite direction of the emission direction of electromagnetic waves from the antenna 7, there is a high possibility of stable wireless communication. By contrast, if a user places the portable proximity wireless communication apparatus 30 from a direction different by 90 degrees from the direction of the antenna 7, electromagnetic waves may not be transmitted and received enough. Accordingly, as shown in FIG. 15(*c*), suppose that another antenna 7 is also installed in a direction that is different by 90 degrees from the directivity of emission shown in FIG. 15(*b*) to emit electromagnetic waves. In this case, even when a user places the portable proximity wireless communication apparatus 30 from a direction different by 90 degrees from an expected direction, there is a high possibility of normal wireless communication.

As the number of the antennas 7 increases, it is possible to widen a possible range of communication, however, the installation cost becomes high. Therefore, the number of the antennas 7 may preferably be set according to need.

Moreover, in the portable proximity wireless communication apparatus 30, when a user takes a place-over action, the user may not always direct the portable proximity wireless communication apparatus 30 in an intended direction. Therefore, if there is only one antenna 7, the emission direction of electromagnetic waves from the antenna 7 may not match the place-over direction. Accordingly, by installing a plurality of antennas 7 that emit electromagnetic waves in different directions in a portable proximity wireless communication apparatus, it is possible to perform more stable wireless communication.

The embodiments of the present invention are not limited to the respective embodiments described above but include a variety of modifications conceivable by parsons skilled in the art. The advantages of the present invention are also not limited to those explained above. Accordingly, various addition, changes, and partial omissions may be made without departing from the scope and spirit of the inventions derived from the accompanying claims and their equivalents.

The invention claimed is:

1. A stationary proximity wireless communication apparatus comprising:
    an electromagnetic-wave transmitting and receiving part comprising (i) a first indicator that indicates a zone to place another proximity wireless communication apparatus and (ii) an antenna that is installed in the zone to emit electromagnetic waves having directivity in a direction of a recommended optimum position in the zone suitable to place said another proximity wireless communication apparatus from a position different from the recommended optimum position; and
    a wireless communication part to perform modulation and demodulation processes of electromagnetic waves transmitted and received at the antenna.

2. The proximity wireless communication apparatus of claim 1, wherein the antenna emits electromagnetic waves so as to have a maximum gain in the direction of the recommended position.

3. The proximity wireless communication apparatus of claim 1, wherein the antenna emits electromagnetic waves which have directivity in a specific angular range along a horizontal plane of the zone, and includes the recommended position in the angular range.

4. The proximity wireless communication apparatus of claim 1, wherein the antenna emits electromagnetic waves having a maximum gain in a direction of a horizontal plane or a in direction of a specific acute angular range from the horizontal plane.

5. The proximity wireless communication apparatus of claim 1, wherein:
    the electromagnetic-wave transmitting and receiving part comprises a second indicator that indicates the recommended position,
    the first and second indicator are provided on a top surface of the zone, and
    the antenna is installed in a specific location lower than the top surface of the zone to emit electromagnetic waves obliquely upward.

6. The proximity wireless communication apparatus of claim 1, wherein the antenna is installed in a location capable of emitting electromagnetic waves in an opposite direction of a direction in which a user of the said another proximity wireless communication apparatus passes through the zone while the user is placing the said another proximity wireless communication apparatus over the zone.

7. The proximity wireless communication apparatus of claim 1, wherein the antenna comprises a plurality of antenna parts that emit electromagnetic waves having directivity in a direction of the recommended position from different directions.

8. The proximity wireless communication apparatus of claim 1, wherein the electromagnetic waves have a frequency in a range from 40 GHz to 80 GHz.

9. A proximity wireless communication apparatus comprising:
    an electromagnetic-wave transmitting and receiving part comprising (i) a first indicator that indicates a recommended position to place the proximity wireless communication apparatus over an indicated position provided to another proximity wireless communication apparatus and (ii) an antenna that is installed in a location different from a location of the first indicator to emit electromagnetic waves having directivity in a direction of the first indicator; and
    a wireless communication part to perform modulation and demodulation processes of electromagnetic waves transmitted and received at the antenna.

10. The proximity wireless communication apparatus of claim 9, wherein the antenna emits electromagnetic waves so as to have a maximum gain in the direction of the first indicator.

11. The proximity wireless communication apparatus of claim 9, wherein the antenna emits electromagnetic waves which have directivity in a specific angular range along a horizontal plane of a zone where the first indicator is provided, and includes the direction of the first indicator within the angular range.

12. The proximity wireless communication apparatus of claim 11, wherein a direction of a maximum gain in a vertical direction of electromagnetic waves emitted from the antenna is a direction of a horizontal plane of the zone or a direction of a specific acute angle that is inclined from the horizontal plane to a rear surface.

13. The proximity wireless communication apparatus of claim 9 comprises a second indicator that indicates a direction in which a user is to place the wireless proximity communication apparatus, the direction being an opposite direction of a direction in which electromagnetic waves emitted from the antenna have a maximum gain.

14. The wireless proximity communication apparatus of claim 9, wherein the first indicator is provided on an opposite surface of a display panel surface.

15. The wireless proximity communication apparatus of claim 9, wherein the electromagnetic waves have a frequency in a range from 40 GHz to 80 GHz.

16. A proximity wireless communication system comprising a first proximity wireless communication apparatus and a second proximity wireless communication apparatus that perform proximity wireless communication with each other, wherein:
    the first proximity wireless communication apparatus comprises:
        a first electromagnetic-wave transmitting and receiving part comprising (i) a first indicator that indicates a zone to place the second proximity wireless communication apparatus and (ii) a first antenna that is installed in the zone to emit electromagnetic waves having directivity in a direction of a recommended optimum position in the zone suitable to place the second proximity wireless communication apparatus from a position different from the recommended optimum position; and
        a first wireless communication part to perform modulation and demodulation processes of electromagnetic waves transmitted and received at the first antenna, and
    the second proximity wireless communication apparatus comprises:
        a second electromagnetic-wave transmitting and receiving part comprising (i) a second indicator that indicates a recommended position to place the second proximity wireless communication apparatus over an indicated position provided to the first proximity wireless communication apparatus and (ii) a second antenna that is installed in a location different from a location of the second indicator to emit electromagnetic waves having directivity in a direction of the second indicator; and a second wireless communication part to perform modulation and demodulation processes of electromagnetic waves transmitted and received at the second antenna.

17. The system of claim 16, wherein:
the first antenna emits electromagnetic waves so as to have a maximum gain in the direction of the recommended position; and
the second antenna emits electromagnetic waves so as to have a maximum gain in the direction of the first indicator.

18. The system of claim 16, wherein:
the first antenna emits electromagnetic waves which have directivity in a specific angular range along a horizontal plane of the zone, and includes the recommended position in the angular range; and
the second antenna emits electromagnetic waves which have directivity in a specific angular range along a horizontal plane of a zone where the first indicator is provided, and includes the direction of the first indicator within the angular range.

19. The system of claim 18, wherein:
the first antenna emits electromagnetic waves having a maximum gain in a direction of a horizontal plane or in a direction of a specific acute angular range from the horizontal plane; and
a direction of a maximum gain in a vertical direction of electromagnetic waves emitted from the second antenna is a direction of a horizontal plane of the zone or a direction of a specific acute angle that is inclined from the horizontal plane to a rear surface.

20. A proximity wireless communication method for performing proximity wireless communication between a first proximity wireless communication apparatus and a second proximity wireless communication apparatus, the method comprising:
emitting electromagnetic waves from a first antenna installed in a location different from a location of a recommended optimum position in a zone suitable to place the second proximity wireless communication apparatus, the first proximity wireless communication apparatus comprising a first indicator that indicates the zone to place the second proximity wireless communication apparatus;
emitting electromagnetic waves, from the second proximity wireless communication apparatus, having directivity in a direction of a second indicator from a second antenna installed in a location different from a location of the second indicator that indicates a recommended position at which the second proximity wireless communication apparatus is to be placed over an indicated position provided to the first proximity wireless communication apparatus; and
placing the second proximity wireless communication apparatus over the recommended position so that an emission direction of electromagnetic waves from the first antenna and an emission direction of electromagnetic waves from the second antenna face each other.

* * * * *